United States Patent [19]

Reidenouer

[11] Patent Number: 4,566,033
[45] Date of Patent: Jan. 21, 1986

[54] TELEVISION VIEWING TIME REGULATOR

[76] Inventor: Linda L. Reidenouer, 205 Rowledge Rd., Charlottesville, Va. 22901

[21] Appl. No.: 522,020

[22] Filed: Aug. 11, 1983

[51] Int. Cl.⁴ .................... H04N 7/16; H04N 1/34
[52] U.S. Cl. .................. 358/115; 194/241; 200/42.01
[58] Field of Search ............... 358/84, 115; 455/2; 194/9 T, 16, 4 F; 200/42 R; 335/205

[56] References Cited

U.S. PATENT DOCUMENTS

| | | | |
|---|---|---|---|
| 3,758,721 | 9/1973 | Main | 335/205 |
| 3,833,779 | 9/1974 | Leone | 200/42 R |
| 4,176,739 | 12/1979 | Corcoran, Jr. | 194/9 T |
| 4,484,041 | 11/1984 | Andres et al. | 335/205 |

Primary Examiner—S. C. Buczinski
Assistant Examiner—Linda J. Wallace
Attorney, Agent, or Firm—B. P. Fishburne, Jr.

[57] ABSTRACT

A small regulator unit including a solid state timer activated by a reed switch is installed between a television receiver and a convenient wall outlet. The unit has a passageway adjacent to the reed switch for the reception of magnetic tokens which act on the reed switch, in turn activating the timer and completing a circuit through the television receiver. After a predetermined time period, the television receiver is turned off automatically so that viewing time can be controlled.

7 Claims, 5 Drawing Figures

TELEVISION VIEWING TIME REGULATOR

BACKGROUND OF THE INVENTION

Parents, child educators and other specialists concerned with proper child development have determined that excessive television viewing by children can be counterproductive, and in some cases can be an impediment to the child's development in many ways.

Consequently, there is a need for a practical, simplified, reliable and inexpensive means to limit the time of television viewing by children and others, particularly where voluntary restrictions are not successful. The device or means must not injure the television receiver when in use and must not require physical alteration of the receiver to be practical. Ideally, the device should be a simple, self-contained unit which can be plugged into a household wall outlet and into which the power cable of the television receiver can be plugged. The objective of this invention is to satisfy all of these requirements in an extremely simplified and inexpensive device which can be operated by a child merely by depositing a token into the device. The token or tokens may constitute an award for good behavior and may be delivered to the child by the parent in a controlled manner, as the parent sees fit in a given circumstance. The token is in the form of a permanent magnet and the use of money to operate the device is thus obviated.

The prior art contains teachings attempting to deal with the above problem but in a much more complex and costly manner. For example, U.S. Pat. No. 4,317,213 discloses a television reception interfering apparatus which operates in conjunction with the antenna of the television receiver to cause interference with incoming television broadcast signals to effectively block reception. The apparatus requires a number of signal generating circuits, each set to generate a signal substantially equal to the carrier frequency of a corresponding television broadcast signal. The apparatus is relatively expensive and complicated and requires a keyboard to operate.

A comparable commercial television viewing control system known as CENSORVIEW is manufactured and sold by Censorview Ltd., Costa Mesa, Calif. This device or system is also relatively expensive and involves a keyboard unit, and therefore does not satisfy the requirements which the present invention completely satisfies with economy and extreme simplicity.

Other features and advances of the invention will become apparent to those skilled in the art during the course of the following description.

DETAILED DESCRIPTION

Figure 1:
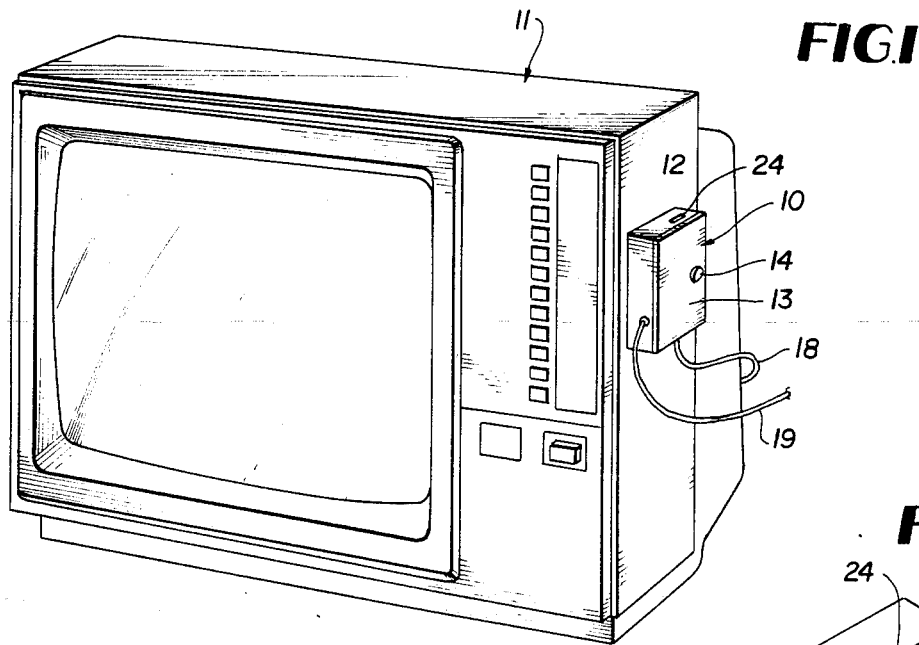
FIG. 1 is a perspective view of a television receiver equipped with a viewing time regulator according to the present invention.
Figure 2:
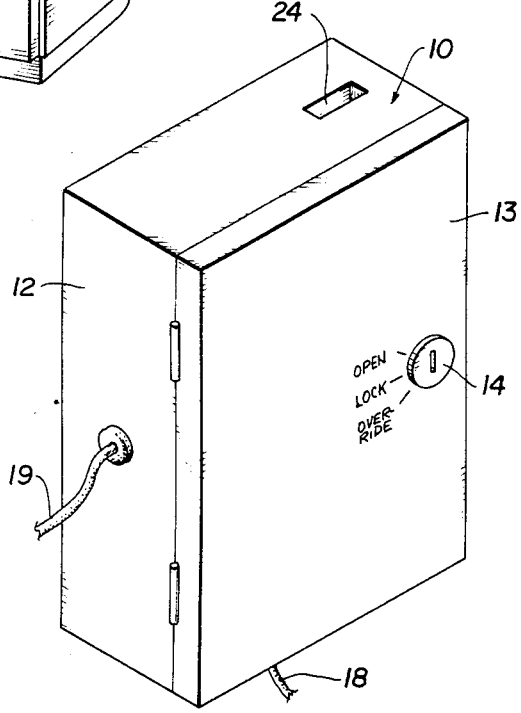
FIG. 2 is an enlarged perspective view of the regulator unit.

Referring to the drawings in detail wherein like numerals designate like parts, a viewing time regulator unit 10 forming the subject matter of the invention is placed on or near a television receiver 11 whose time of operation it is desired to control. The box-like unit 10 may be mounted on the television receiver through pressure-sensitive adhesive means or the like which will not damage the surface finish of the receiver.

The regulator or control unit 10 includes a rectangular box 12 preferably having a hinged cover 13 provided with a key-operated lock 14. The lock is conventional and may be of a type having three positions under control of the key to lock the cover 13, to unlock it, and to override the circuitry of the regulator unit so that adults may operate the television receiver without restriction and without the necessity for using magnetic tokens.

Figure 5:
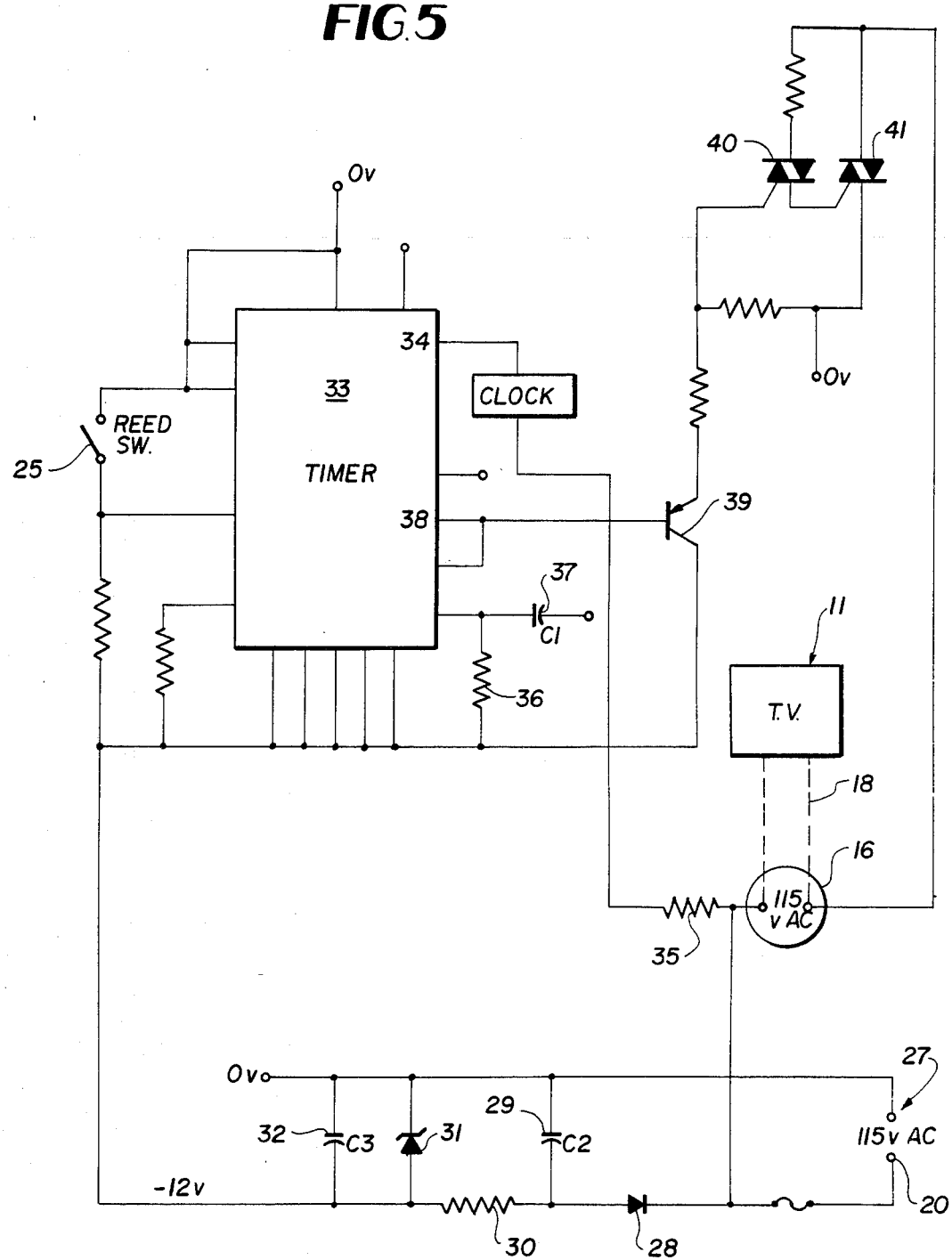
FIG. 5 is a schematic view of circuitry included in the regulator unit.

Within the regulator box 12 is a preferably closed compartment 15 for the electrical circuitry embodied in the device, the details of which are shown in FIG. 5. A receptacle 16 for the plug 17 on the power cable 18 of the television receiver 11 is also provided in the box 12 and is electrically connected with the circuitry in the compartment 15. A further cable 19 leading from the circuitry within the compartment 15 is equipped with a plug, not shown, and extends to any conveniently located household receptacle 20, FIG. 5.

Also within the box 12 near the top thereof in the use position of the device and between compartment 15 and one box side wall 21 is a vertical chute 22 for magnetic tokens 23 required to be used in the operation of the regulator unit. A token depositing slot 24 in registration with the chute 22 opens through the top wall of the box 12, as shown.

Figure 3:
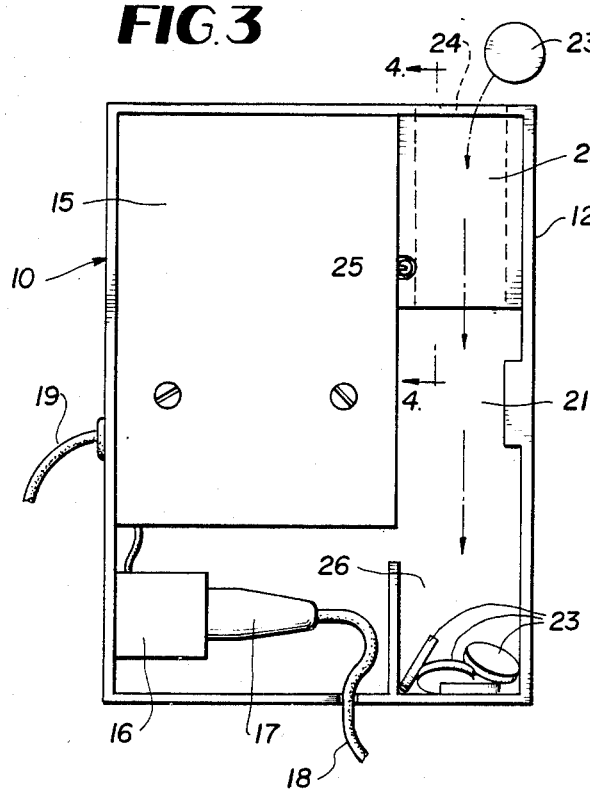
FIG. 3 is a side elevational view of the regulator unit with its cover removed.
Figure 4:
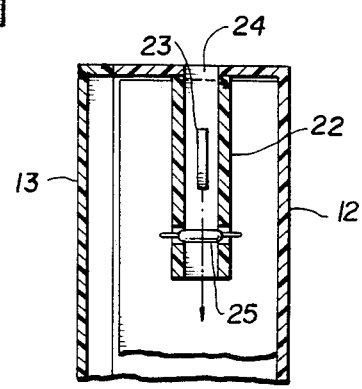
FIG. 4 is an enlarged fragmentary vertical section taken on line 4—4 of FIG. 3.

A magnetic reed switch 25 is fixedly held on the vertical chute 22 close to one side of its token passageway, FIGS. 3 and 4, and this switch forms a part of the operating circuitry of the regulator unit.

The magnetic tokens 23, after gravitating through the chute 22, fall into a collection compartment 26 at the bottom of the unit.

In terms of its physical construction, the regulator unit 10 is lightweight, compact, quite inexpensive, easy to install and requires no skill to operate. The mere depositing of magnetic tokens 23 in the regulator unit turns on the television receiver for a predetermined time interval, after which the receiver is automatically turned off, so that a child user is restricted in his or her viewing time in accordance with the desires of a parent.

The operation of the device is best described with reference to FIG. 5 of the drawings. In this figure, a 115 volt AC power supply 27 includes the aforementioned receptacle 20 which receives the plug of cable 19. A 12 volt regulated power supply for the unit is obtained through a ½ wave rectifier 28, filtering means including a capacitor 29 and resistor 30, a regulator 31 and a filter capacitor 32.

A timer chip 33 is utilized in the regulator unit, such as an MC14536B chip manufactured by Motorola Semiconductors, P.O. Box 20912, Phoenix, Ariz. 85036. Pin 34 of the timer chip 33 is the clock input of the timer chip. It is connected through a resistor 35 to the 115 volt 60 Hz. line. Resistor 36 and capacitor 37 set the timer during the initial application of power thereto (when the timer is plugged in) so that the television receiver 11 will not go on.

When a magnetic token 23 is deposited in the slot 24, reed switch 25 closes and starts the timer 33. At this point, the pin 38 of the timer goes low. This turns on a transistor 39, which in turn turns on triacs 40 and 41.

After a time interval of 36 minutes and 24 seconds, the timer turns off, pin 38 goes high, and transistor 39 and the triacs 40 and 41 turn off, thus interrupting power to the television receiver 11. The control circuitry is extremely simple, and being solid state enables the regulator unit to be very compact, thus avoiding the complexities and excessive cost of prior art systems.

In essence, therefore, the invention is a simple, self-contained, viewing time regulator unit into which a television receiver power cord is plugged and from which another power cord is plugged into a 115 volt 60 Hz. outlet. The unit includes its own regulated 12 volt power supply, a timer activated by a magnetic reed switch responding to the depositing of magnetic tokens and a transistor which activates triacs to enable the delivery of operating power to the television receiver. The only action required by a child user is the depositing of the magnetic token 23 into the slot 24 to turn on the television receiver for a predetermined time interval, after which the receiver is automatically turned off.

It is to be understood that the form of the invention herewith shown and described is to be taken as a preferred example of the same, and that various changes in the shape, size and arrangement of parts may be resorted to, without departing from the spirit of the invention or scope of the subjoined claims.

I claim:

1. A television viewing time regulator unit including a receptacle adapted to receive a plug of a television receiver power cable and further including another power cable adapted to be plugged into a conventional household power outlet, a regulated power supply on the regulator unit connected with said another power cable, a timer circuit means on the regulator unit including a magnetically operated activating switch and means to enable the delivery of operating power through the first-named receptacle to the television receiver for a predetermined period of time regulated by the timer circuit means, and the regulator unit having a receiving passage adjacent to the magnetically operated activating switch for a token of magnetic material.

2. A television viewing time regulator unit as defined in claim 1, and said activating switch comprising a magnetic reed switch fixed at one side of a substantially vertical chute having the receiving passage for the token.

3. A television viewing time regulator unit as defined in claim 2, and the unit including a housing which encloses all of its components except said power cables, and said chute opening through one wall of said housing.

4. A television viewing time regulator unit as defined in claim 3, and the housing including an access cover provided with a locking means.

5. A television viewing time regulator unit as defined in claim 1, and said means to enable the delivery of operating power through the first-named receptacle to the television receiver including a transistor coupled to said timer circuit means and a pair of triacs coupled in parallel to said first-named receptacle, said transistor being rendered operable by said timer circuit means to trigger said triacs into conduction and thereby complete a power delivery circuit to said first-named receptacle.

6. A television viewing time regulator unit as defined in claim 1, and said timer circuit means comprising a timer chip having a connection with the magnetically operated activating switch, and said means to enable the delivery of operating power through the first-named receptacle to the television receiver comprising a transistor having a connection with said timer chip and a triac means coupled between the transistor and the first-named receptacle.

7. A television viewing time regulator unit adapted to be interposed between a television receiver and an outlet for 115 volt 60 Hz. power, said unit having within a regulated power supply connected with said outlet, a timer within the unit, a magnetically operated timer activating switch on the unit responding to the deposit of a magnetic token into the unit, and means electrically interconnecting the timer and a television receiver requiring regulation by the timer and including means enabling the delivery of operating power to the television receiver for a predetermined operating time interval under control of the timer.

* * * * *